United States Patent
Hirata et al.

(10) Patent No.: US 9,211,601 B2
(45) Date of Patent: Dec. 15, 2015

(54) AUSTENITIC STEEL WELDED JOINT

(75) Inventors: Hiroyuki Hirata, Neyagawa (JP);
Tomohiko Omura, Kishiwada (JP);
Yusaku Tomio, Nishinomiya (JP); Jun Nakamura, Nishinomiya (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/130,368

(22) PCT Filed: Jun. 20, 2012

(86) PCT No.: PCT/JP2012/065694
§ 371 (c)(1),
(2), (4) Date: Feb. 24, 2014

(87) PCT Pub. No.: WO2013/005570
PCT Pub. Date: Jan. 10, 2013

(65) Prior Publication Data
US 2014/0186101 A1  Jul. 3, 2014

(30) Foreign Application Priority Data
Jul. 6, 2011  (JP) .................................. 2011-149692

(51) Int. Cl.
*B23K 9/167* (2006.01)
*B32B 15/04* (2006.01)
(Continued)

(52) U.S. Cl.
CPC ............... *B23K 9/167* (2013.01); *B23K 35/308* (2013.01); *B23K 35/3053* (2013.01);
(Continued)

(58) Field of Classification Search
CPC .... C22C 38/001; C22C 38/002; C22C 38/02;
C22C 38/06; C22C 38/44; C22C 38/46;
C22C 38/48; C22C 38/58; C22C 38/04;
C22C 38/18; C22C 38/40; C22C 38/004;
C22C 38/08; C22C 38/12; C22C 38/24;
C22C 38/38; Y10T 428/12951; Y10T
428/12958; Y10T 428/12965; Y10T
428/12972; Y10T 428/12979
See application file for complete search history.

(56) References Cited

U.S. PATENT DOCUMENTS

2002/0148533 A1  10/2002 Kim et al.
2011/0097234 A1* 4/2011 Oikawa et al. .................. 420/38

FOREIGN PATENT DOCUMENTS

CN  101032780  9/2007
EP  0 864 663  9/1998
(Continued)

OTHER PUBLICATIONS

Canadian Patent Office, Office Action in Application No. 2,839,128, issued on Aug. 19, 2015.*

*Primary Examiner* — Michael E La Villa
(74) *Attorney, Agent, or Firm* — Clark & Brody

(57) ABSTRACT

An austenitic steel welded joint is produced by gas tungsten arc welding an austenitic steel base metal with a welding material of austenitic steel having a composition comprising: C≤0.1%; Si≤0.8%; Mn: 1.5 to 5.5%; Ni: 8 to 15%; Cr: 18 to 24%; Al<0.05%; N: 0.15 to 0.35%; and one or more of V≤0.5%, Nb≤0.5%, and Mo≤4.5% if necessary, the balance being Fe and impurities that contain O≤0.02%, P≤0.05%, and S≤0.03%. The chemical composition satisfies [413–462(C+N)–9.2Si–8.1Mn–13.7Cr–9.5Ni–18.5Mo≤–70]. The amount of ferrite of the weld metal is 20% or less in area ratio. The welded joint has high strength and excellent hydrogen embrittlement resistance and is useful in high-pressure hydrogen gas piping where no postweld heat treatment is performed.

2 Claims, 1 Drawing Sheet

(51) Int. Cl.
| | |
|---|---|
| B32B 15/18 | (2006.01) |
| B23K 35/30 | (2006.01) |
| C22C 38/00 | (2006.01) |
| C22C 38/02 | (2006.01) |
| C22C 38/06 | (2006.01) |
| C22C 38/44 | (2006.01) |
| C22C 38/46 | (2006.01) |
| C22C 38/48 | (2006.01) |
| C22C 38/58 | (2006.01) |
| C21D 9/50 | (2006.01) |
| C22C 38/04 | (2006.01) |
| C22C 38/18 | (2006.01) |
| C22C 38/40 | (2006.01) |

(52) U.S. Cl.
CPC ............ *B23K 35/3086* (2013.01); *C21D 9/50* (2013.01); *C22C 38/001* (2013.01); *C22C 38/002* (2013.01); *C22C 38/02* (2013.01); *C22C 38/04* (2013.01); *C22C 38/06* (2013.01); *C22C 38/18* (2013.01); *C22C 38/40* (2013.01); *C22C 38/44* (2013.01); *C22C 38/46* (2013.01); *C22C 38/48* (2013.01); *C22C 38/58* (2013.01); *B23K 2201/04* (2013.01); *B23K 2201/06* (2013.01); *B23K 2201/10* (2013.01); *Y10T 403/479* (2015.01); *Y10T 428/12965* (2015.01); *Y10T 428/12972* (2015.01); *Y10T 428/12979* (2015.01)

(56) References Cited

FOREIGN PATENT DOCUMENTS

| | | |
|---|---|---|
| EP | 2 295 197 | 3/2011 |
| GB | 1 293 696 | 10/1972 |
| JP | 05-192785 | 8/1993 |
| JP | 09-228003 | 9/1997 |
| JP | 09-308988 | 12/1997 |
| JP | 2010-121190 | 6/2010 |
| JP | 2010-227949 | 10/2010 |
| WO | 2004/083476 | 9/2004 |
| WO | 2004/083477 | 9/2004 |
| WO | 2004/110695 | 12/2004 |

* cited by examiner

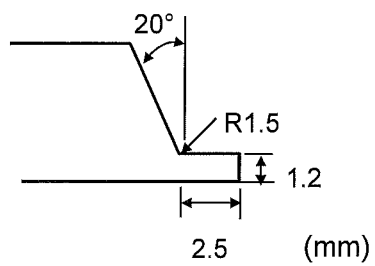

AUSTENITIC STEEL WELDED JOINT

TECHNICAL FIELD

The present invention relates to an austenitic steel welded joint. Specifically, the present invention relates to a welded joint having not only high strength required in high-pressure gas piping, but also high strength and excellent hydrogen embrittlement resistance that are properties required in high-pressure hydrogen gas piping at the same time.

BACKGROUND ART

Recently, various studies have enthusiastically been conducted on the practical use of transportation equipment that utilizes hydrogen, natural gas and the like as energy. To facilitate the practical use, it is required at the same time to fulfill infrastructure of a usage environment for storing and transporting such gases at high pressure, so that high-strength materials for use in this usage environment, having tensile strength of more than 800 MPa, have simultaneously been developed as well as planning of applications of these materials.

In such a background, as material for use in the above environment, Patent Documents 1 to 3 suggest, for example, austenitic stainless steel having high content of Mn for the purpose of enhancing solubility of N, and also containing V or a combination of V and Nb so as to utilize solid-solution strengthening of N and precipitation strengthening of Nitride, thereby attaining high strengthening.

In the case of using such high-strength austenitic steel containing a large amount of N as a structure, assembly by welding is necessary, and welded portions are required to have strength equal to that of base metal in the light of a use performance thereof. For this purpose, Patent Documents 3 to 5 suggest welding materials (weld metal) having tensile strength of more than 800 MPa by positively utilizing Al, Ti, and Nb, for example.

Unfortunately, both the welding materials and the weld metal produced by using these welding materials require postweld heat treatment for attaining high strength. Meanwhile, taking account of a real size of a large structure, postweld heat treatment for such long hours greatly limits its feasibility, and may also cause extreme increase in production cost.

LIST OF PRIOR ART DOCUMENTS

Patent Document

Patent Document 1: WO 2004/083476
Patent Document 2: WO 2004/083477
Patent Document 3: WO 2004/110695
Patent Document 4: JP5-192785A
Patent Document 5: JP2010-227949A

DISCLOSURE OF THE INVENTION

Problems to be Solved by the Invention

An object of the present invention, which has been made in view of the above situation, is to provide a welded joint having both high strength and excellent hydrogen embrittlement resistance which are properties required in high-pressure gas piping, particularly in high-pressure hydrogen gas piping without the postweld heat treatment.

Means for Solving the Problems

In order to solve the aforementioned problems, the present inventors have conducted careful studies. As a result, first, in order to attain high strength in the weld metal without the postweld heat treatment, it has been found that it is effective to make the most of solid-solution strengthening by using N.

Further careful studies have been conducted on how to secure strength, without the postweld heat treatment, in the weld metal equal to strength in the base metal consisting of, by mass %, C: 0.1% or less, Si: 0.8% or less, Mn: 2.5 to 5.5%, Ni: 8 to 15%, Cr: 19 to 25%, Al: less than 0.05%, and N: 0.15 to 0.45%.

In addition, the hydrogen embrittlement susceptibility of the obtained welded portions was evaluated, and careful studies were conducted so as to at least attain the hydrogen embrittlement resistance equal to that of the base metal.

As a result, the following findings (a) to (c) were uncovered.

(a) It is possible to secure strength equal to that in the base metal by containing N of 0.15% or more by mass % in the weld metal within a chemical composition range of Cr: 18 to 24%, and Ni: 8 to 15% by mass %.

(b) If a large amount of ferrite is contained in the weld metal, the ferrite initiates hydrogen embrittlement cracks, and the cracks combine together to propagate, thereby deteriorating hydrogen embrittlement resistance of the weld metal. By adjusting the chemical composition, however, such that the amount of the ferrite in the weld metal becomes 20% or less in area ratio, it is possible to attain excellent hydrogen embrittlement resistance.

(c) If an austenite phase in the weld metal is unstable, the austenite phase transforms to martensite caused by welding residual strain and machining after the welding, thereby the hydrogen embrittlement susceptibility becomes high. By adjusting the chemical composition, specifically, if the chemical composition of the weld metal is adjusted so as to satisfy

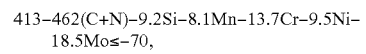

$$413-462(C+N)-9.2Si-8.1Mn-13.7Cr-9.5Ni-18.5Mo \leq -70,$$

where a symbol of each element in the above Formula denotes a content (mass %) of the element, it is possible to enhance the stability of the austenite, and also to attain excellent hydrogen embrittlement resistance.

It is also found that in order to contain N of 0.15% or more by mass % in the weld metal within the composition range of Cr: 18 to 24%, and Ni: 8 to 15% by mass % according to the above (a), it is preferable to carry out the following methods <1> to <3>.

<1> N scatters from the surface of a molten pool during the welding, so that the amount of N remaining in the weld metal after the welding is decreased. Hence, welding heat input is controlled and/or a groove shape is selected so as to reduce the surface area of the molten pool during the welding.

<2> A gas made by mixing $N_2$ of 0 to 50% in volume % in Ar is used for a shield gas so as to reduce scatters of N from the surface of the molten pool during the welding. Note that the mixed $N_2$ of 0% in volume % represents that the Ar gas is used alone.

<3> A gas made by mixing $N_2$ of 0 to 100% in volume % in Ar is used as a back shield gas so as to prevent scatters of N from the surface of the molten pool on the backside during the first layer welding. Note that mixed $N_2$ of 0% in volume % represents that the Ar gas is used alone. The mixed $N_2$ of 100% in volume % represents that the $N_2$ gas is used alone.

The present invention has been accomplished based on the above findings, and its gist is described by the austenitic steel welded joint set forth in the following constitutions (1) and (2).

(1) An austenitic steel welded joint produced by welding base metal with a gas tungsten arc welding process which uses welding material, wherein the base metal has a chemical composition comprising: by mass %, C: 0.1% or less; Si: 0.8% or less; Mn: 2.5 to 5.5%; Ni: 8 to 15%; Cr: 19 to 25%; Al: less than 0.05%; and N: 0.15 to 0.45%, the balance being Fe and impurities that contain O: 0.02% or less, P: 0.05% or less, and S: 0.03% or less, and the welding material has a chemical composition comprising: by mass %, C: 0.1% or less; Si: 0.8% or less; Mn: 1.5 to 4.5%; Ni: 8 to 15%; Cr: 18 to 24%; Al: less than 0.05%; and N: 0.15 to 0.35%, the balance being Fe and impurities that contain O: 0.02% or less, P: 0.05% or less, and S: 0.03% or less, wherein weld metal has a chemical composition comprising: by mass %, C: 0.1% or less; Si: 0.8% or less; Mn: 1.5 to 5.5%; Ni: 8 to 15%; Cr: 18 to 24%; Al: less than 0.05%; and N: 0.15 to 0.35%, the balance being Fe and impurities that contain O: 0.02% or less, P: 0.05% or less, and S: 0.03% or less, the chemical composition of the weld metal satisfies Formula (1), and an amount of ferrite in the weld metal is 20% or less in area ratio.

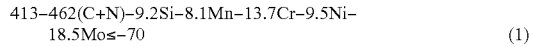

$$413-462(C+N)-9.2Si-8.1Mn-13.7Cr-9.5Ni-18.5Mo \leq -70 \quad (1)$$

where a symbol of each element in Formula (1) denotes a content (mass %) of the element.

(2) The austenitic steel welded joint set forth in the above (1), wherein the chemical composition of any one or more of the base metal, the welding material, and the weld metal comprise one or more of, by mass %, V: 0.5% or less, Nb: 0.5% or less, and Mo: 4.5% or less, in lieu of part of Fe.

"Impurities" of "Fe and impurities" as the balance denote minerals or scraps as row materials, or substances mixed through an environment of a manufacturing process and the like during industrial production of steel materials.

Advantageous Effects of the Invention

According to the present invention, it is possible to provide a welded joint having both high strength and excellent hydrogen embrittlement resistance which are properties required in high-pressure gas piping, particularly in high-pressure hydrogen gas piping without the postweld heat treatment.

BRIEF DESCRIPTION OF THE DRAWING

FIG. 1 is a drawing explaining a grooving shape.

MODE FOR CARRYING OUT THE INVENTION

The reason for limiting chemical compositions of base metal(s), welding material, and weld metal, as well as a micro-structure of the weld metal in the austenitic steel welded joint of the present invention is as follows.

In the following description, a symbol "%" of content of each element denotes "mass %", hereinafter.

(A) Chemical Compositions of Base Metal, Welding Material, and Weld Metal

C: 0.1% or less (base metal, welding material, and weld metal)

C is an element effective for stabilizing austenite. C generates carbide, however, at grain boundaries with heating during the welding, and deteriorates corrosion resistance as well as causes deterioration of ductility. Accordingly, the upper limit of the C content is defined to be 0.1%. The more preferable upper limit of the C content is 0.08%. It is unnecessary to specifically define the lower limit of the C content, but extreme decrease in the C content causes significant increase in production cost. Accordingly, the preferable lower limit of the C content is 0.002%.

Si: 0.8% or less (base metal, welding material, and weld metal)

Si is an element effective as a deoxidizer, and effective for enhancement of corrosion resistance. The excessive Si content, however, causes deterioration of stability of the austenite, and deterioration of ductility, and the excessive Si content in the weld metal causes segregation at columnar crystal boundaries during the solidification, which decreases the fusing point of the liquid phase, and increases solidification cracking susceptibility. Accordingly, the Si content is defined to be 0.8% or less. The Si content is preferably defined to be 0.6% or less. It is unnecessary to specifically define the lower limit of the Si content, but extreme decrease in the Si content hinders the sufficient deoxidation effect, and deteriorates cleanliness of steel, as well as increases the production cost. Accordingly, the preferable lower limit of the Si content is 0.01%.

Mn: 2.5 to 5.5% (base metal), 1.5 to 4.5% (welding material), 1.5 to 5.5% (weld metal)

Mn is an element effective as a deoxidizer, and effective for stabilizing the austenite. Mn increases solubility of N in molten metal during the production of the base metal and during the welding, thereby indirectly contributing to enhancement of strength. In order to sufficiently attain this strength enhancing effect, the Mn content should be 2.5% or more in the base metal. Meanwhile, the solidification speed of the weld metal is faster compared to that of the base metal during its production, and the weld metal has smaller decrease in N during the solidification, so that Mn is contained 1.5% or more in the weld metal. The Mn content in the welding material which is to be melted during welding, and entire of which becomes the weld metal is the same as that in the weld metal. The preferable lower limit of the Mn content is 2.7% in the base metal, and 1.7% in the welding material and in the weld metal. On the other hand, the excessive Mn content causes deterioration of ductility. Hence, the upper limit of the Mn content in the base metal and in the weld metal should be 5.5%. In order to secure the workability of welding material, the upper limit of the Mn content in the welding material should be more strictly restricted compared to the base metal and the weld metal, so that the upper limit of the Mn content is 4.5%. The preferable upper limit of the Mn content is 5.0% in the base metal and in the weld metal, and 4.0% in the welding material.

Ni: 8 to 15% (base metal, welding material, and weld metal)

Ni is an essential element to obtain stable austenite, and the Ni content of 8% or more is required for sufficiently attaining this effect. Ni is, however, an expensive element, so that large content of Ni causes increase in cost, and decreases solubility of N in the molten metal during the production of the base metal, and during the welding. Accordingly, the upper limit of the Ni content is defined to be 15%. The preferable lower limit of the Ni content is 8.2%, and the preferable upper limit thereof is 14.5%.

Cr: 19 to 25% (base metal), 18 to 24% (welding material and weld metal)

Cr is an essential element for securing corrosion resistance in the usage environment. Cr is effective to increase solubility of N in the molten metal during the production of the base metal and during the welding, and the Cr content of 19% or more in the base metal is necessary for sufficiently attaining this effect. Meanwhile, the solidification speed of the weld metal is faster compared to that of the base metal during its production, and the weld metal has smaller decrease in N during the solidification process, so that the Cr content is defined to be 18% or more. The Cr content in the welding material which is to be melted during the welding, and entire of which becomes the weld metal is the same as that in the weld metal. The preferable lower limit of the Cr content is 19.2% in the base metal, and 18.2% in the welding material and the weld metal. On the other hand, the excessive Cr content causes unstable austenite, and may cause embrittlement depending on the type of the gas environment. Accordingly, it is necessary to define the upper limit of the Cr content in the base metal to be 25%. Since the micro-structure of the weld metal becomes unstable due to solidification segregation, the Cr content in the weld metal should be more strictly controlled, and thus the upper limit of the Cr content in the weld metal is defined to be 24%. The upper limit of the Cr content in the welding material which is to be melted during the welding, and entire of which becomes the weld metal is the same as that in the weld metal. The preferable upper limit of the Cr content is 24.5% in the base metal, and 23.5% in the welding material and the weld metal.

Al: less than 0.05% (base metal, welding material, and weld metal)

Al is contained as a deoxidizer as similar to Si and Mn. The excessive Al content, however, generates a large amount of nitride, and causes deterioration of ductility. Hence, the Al content is defined to be less than 0.05%. The Al content is preferably 0.04% or less. It is unnecessary to specifically define the lower limit of the Al content, but extreme decrease in the Al content hinders sufficient attainment of the deoxidation effect, so that the index of cleanliness of steel becomes increased, resulting in deterioration of cleanliness and increase in production cost. Accordingly, the preferable lower limit of the Al content is 0.003%.

N: 0.15 to 0.45% (base metal), N: 0.15 to 0.35% (welding material and weld metal)

N is an element soluble in the matrix and forms fine nitride, and thus N is an essential element for ensuring the high strength. The N content should be 0.15% or more so as to sufficiently attain this effect. In the base metal, however, the N content of more than 0.45% causes deterioration of hot workability during the production of the base metal. Hence, the upper limit of the N content in the base metal should be 0.45%. In the weld metal, N which is contained more than 0.35% cannot dissolve in a molten pool during the welding, and causes blowholes and/or pits. Hence, the upper limit of the N content in the weld metal should be 0.35%. In the welding material which is to be melted during the welding, and entire of which becomes the weld metal, the upper limit of the N content should be 0.35%, for the same reason as that of the weld metal. The preferable lower limit of the N content in the base metal is 0.16%, and the preferable upper limit thereof is 0.42%. In the welding material and the weld metal, the preferable lower limit of the N content is 0.16%, and the preferable upper limit thereof is 0.32%.

The base metal, the welding material, and the weld metal of the austenitic steel welded joint of the present invention have a chemical composition in which the aforementioned elements from C to N are contained, the balance being Fe and impurities, and the contents of O, P, and S as the impurities are limited in the following ranges.

O: 0.02% or less (base metal, welding material, and weld metal)

O exists as an impurity, and a large amount of O causes the deterioration of hot workability of the base metal and the welding material during the production of them, and also causes the deterioration of toughness and ductility of the weld metal. Accordingly, the O content should be 0.02% or less. The preferable upper limit of the O content is 0.01%.

P; 0.05% or less (base metal, welding material, and weld metal)

P is contained as an impurity, and a large amount of P in the base metal and in the welding material hinders the hot workability during the production of them. In the weld metal, a large amount of P decreases the fusing point of the liquid phase at the time of solidification and causes increase in solidification cracking susceptibility. Accordingly, the P content is preferably reduced as small as possible, but excessive reduction of the P content causes increase in production cost of the steel; therefore the P content is defined to be 0.05% or less. The preferable P content is 0.03% or less.

S: 0.03% or less (base metal, welding material, and weld metal)

As similar to P, S is contained as an impurity, and a large amount of S in the base metal and in the welding material hinders the hot workability during the production of them. In the weld metal, a large amount of S decreases the fusing point of the liquid phase at the time of solidification and causes increase in solidification cracking susceptibility in. Accordingly, as similar to P, the S content is preferably reduced as small as possible, but excessive reduction of the S content causes increase in production cost of the steel; therefore the upper limit of the S content is defined to be 0.03%. The preferable S content is 0.01% or less.

The base metal, the welding material, and the weld metal of the austenitic steel welded joint of the present invention may contain one or more elements of V, Nb, and Mo in lieu of part of Fe in "Fe and the impurities" as the balance.

Hereinafter, operational advantages of V, Nb, and Mo that are optional elements will be described along with the reason for limiting the content of each element.

V: 0.5% or less

V dissolves in the matrix or precipitates as carbide, and is an effective element for enhancing the strength, and therefore may be contained. The excessive V content of more than 0.5%, however, allows a large amount of carbide to precipitate, which causes the deterioration of ductility. Accordingly, the V content is defined to be 0.5% or less if contained. The preferable upper limit of the V content is 0.4% if contained.

In order to stably attain the above effect of V, the V content is preferably 0.01% or more.

Nb: 0.5% or less

As similar to V, Nb may be contained because Nb dissolves in the matrix or precipitates carbo-nitride, and is an effective element for enhancing the strength. The excessive Nb content of more than 0.5%, however, allows a large amount of carbo-nitride to precipitate, which causes the deterioration of ductility. Accordingly, the Nb content is defined to be 0.5% or less if contained. The preferable upper limit of the Nb content is 0.4% if contained.

In order to stably attain the above effect of Nb, the Nb content is preferably 0.01% or more.

Mo: 4.5% or less

Mo is an effective element for enhancing the strength. Mo is also an effective element for enhancing the corrosion resistance in the usage environment. Accordingly, Mo may be contained. Mo is, however, a very expensive element, and the excessive Mo content of more than 4.5% causes unstable austenite. Accordingly, the content of Mo is defined to be 4.5% or less if contained. The preferable upper limit of the Mo content is 4% if contained.

In order to stably attain the above effect of Mo, the Mo content is preferably 0.1% or more.

Only any one of V, Nb, and Mo, or more than one of these elements in combination may be contained. In the case of containing these elements in combination, the total amount of these elements may be 5.5% in the case of using the respective upper limits of the contents of V, Nb, and Mo, but this is preferable 5.0% or less.

In addition, the chemical composition of the weld metal of the austenitic steel welded joint of the present invention should satisfy the following Formula (1).

$$413-462(C+N)-9.2Si-8.1Mn-13.7Cr-9.5Ni-18.5Mo \leq -70 \quad (1),$$

where a symbol of each element in Formula (1) denotes a content (mass %) of the element.

The austenite in the weld metal is unstable because the weld metal has a rapidly solidified micro-structure, so that the austenite phase transforms to martensite caused by welding residual strain and machining after the welding, and the hydrogen embrittlement resistance is deteriorated. However, the austenite is stabilized when Formula (1) is satisfied, so that it is possible to prevent the martensitizing caused by the welding residual strain and the machining after the welding. The left term of Formula (1) is preferably −80 or less, and it is more preferable if this is as small as possible.

(B) Micro-Structure of Weld Metal

The micro-structure of the weld metal is a rapidly solidified micro-structure. The ferrite generated at a high temperature in the solidifying process remains even at a room temperature in the weld metal, which is different from the base metal produced through solid-solution heat treatment. The ferrite becomes embrittled in the hydrogen environment and initiates fracture. Then, if it exists continuously, it combines together and propagate, thereby deteriorating the hydrogen embrittlement resistance of the weld metal. The amount of the ferrite of 20% or less in area ratio, however, hardly causes the above problems. Accordingly, the amount of the ferrite in the weld metal is defined to be 20% or less in area ratio. The amount of the ferrite in the weld metal is preferably 15% or less in area ratio. The lower limit of the amount of the ferrite in the weld metal may be 0% in area ratio, that is, the weld metal may be fully austenite.

The amount of the ferrite in the weld metal in area ratio becomes increased if ferrite generating elements represented by Cr and Si become increased relative to austenite generating elements represented by Ni, Mn, and C in the weld metal. Accordingly, the above amount of the ferrite in the weld metal in area ratio can be attained by adjusting such that the chemical composition of the weld metal satisfies the aforementioned range, and the excessive amount of the ferrite generating elements is not contained relative to the austenite generating elements.

In order to produce the weld metal including the above chemical composition and the amount of the ferrite by using the base metal and the welding material having the aforementioned chemical composition, it is preferable to make the surface area of the molten pool during the welding as small as possible with the gas tungsten arc welding process.

In the welding with the gas tungsten arc welding process, it is preferable to control the welding condition such that a crater surface area after the completion of welding becomes 120 mm$^2$ or less.

In the welding with the gas tungsten arc welding process, it is more preferable to use a gas made by mixing an N$_2$ gas in an Ar gas for a shield gas and a back shield gas. The reason for this is as follows.

Compared to a gas metal arc welding, the gas tungsten arc welding readily attains a defect-free, high-quality welded joint. In spite of this, this welding process causes scatters of N from the surface of the molten pool during the welding, so that the amount of N remaining in the weld metal after the welding is decreased, resulting in deterioration of the strength. In order to prevent this, it is effective to decrease the surface area of the molten pool during the welding so as to reduce a region where N scatters. Specifically, the surface area of the molten pool during the welding corresponds to the crater surface area of each layer after the completion of welding; therefore, it is preferable to adjust the welding condition such that the crater surface area becomes 120 mm$^2$ or less.

It is effective to mix the N$_2$ gas in the shield gas or the backshield gas so as to increase a partial pressure of N for the sake of reducing scatters of N from the surface of the molten pool, and it nitrides the surface of the solidified weld metal, thereby slightly contributing to strengthen the weld metal. If N$_2$ in the shield gas or in the backshield gas becomes more than 50% in the volume %, N which is dissolved in the weld metal at a high temperature cannot be dissolved any more in the weld metal during solidification, and becomes turned into N$_2$; thus blowholes and/or pits may be generated in some cases. Accordingly, it is preferable to define the upper limit of the N$_2$ gas in the shield gas or in the backshield gas to be 50% in volume %.

Hereinafter, the present invention will be more specifically described by using examples, but the present invention is not limited to the examples.

EXAMPLES

Ingots produced by laboratory dissolving and casting materials indicated by reference symbols A to C having chemical compositions shown in Table 1 were subjected to hot forging, hot rolling, heat treatment, and machining so as to produce steel plates of 3 mm in thickness, 50 mm in width, and 100 mm in length for the welding base metal.

Ingots produced by laboratory dissolving and casting materials indicated by reference symbols V to Z having chemical compositions shown in Table 2 were subjected to hot forging, hot rolling, and machining so as to produce welding wires (welding material) of 1.2 mm in outer diameter.

Each of the above produced steel plates for the welding base metal was subjected to groove machining in its longitudinal direction as shown in FIG. 1, and thereafter, a butt welding was carried out in combination of the base metal and the welding material under the welding conditions as shown in Table 3 with the gas tungsten arc welding process. The welding was completed with two-layer welding, and weaving was also carried out on certain joints during the welding.

TABLE 1

| | Chemical composition (mass %) Balance: Fe and impurities | | | | | | | | | | | | |
|---|---|---|---|---|---|---|---|---|---|---|---|---|---|
| Symbol | C | Si | Mn | P | S | Ni | Cr | Mo | V | Nb | Al | N | O |
| A | 0.031 | 0.41 | 4.52 | 0.017 | 0.001 | 12.2 | 21.9 | 2.1 | 0.22 | 0.23 | 0.012 | 0.32 | 0.007 |
| B | 0.030 | 0.42 | 3.57 | 0.017 | 0.001 | 9.8 | 20.5 | 2.5 | — | 0.31 | 0.009 | 0.40 | 0.005 |
| C | 0.068 | 0.39 | 5.13 | 0.015 | 0.001 | 8.8 | 24.1 | — | — | — | 0.010 | 0.42 | 0.005 |

TABLE 2

| | Chemical composition (mass %) Balance: Fe and impurities | | | | | | | | | | | | |
|---|---|---|---|---|---|---|---|---|---|---|---|---|---|
| Symbol | C | Si | Mn | P | S | Ni | Cr | Mo | V | Nb | Al | N | O |
| V | 0.035 | 0.38 | 1.80 | 0.020 | 0.004 | 8.4 | *24.5 | 3.2 | — | — | 0.006 | *0.37 | 0.006 |
| W | 0.012 | 0.11 | 1.50 | 0.020 | 0.006 | 8.3 | 19.0 | — | — | — | 0.005 | 0.15 | 0.006 |
| X | 0.078 | 0.20 | 2.20 | 0.040 | 0.005 | 9.7 | 21.4 | — | — | 0.05 | 0.008 | 0.16 | 0.005 |
| Y | 0.013 | 0.41 | 1.90 | 0.015 | 0.008 | 13.8 | 19.4 | 3.8 | 0.01 | — | 0.006 | 0.18 | 0.003 |
| Z | 0.018 | 0.35 | 1.60 | 0.022 | 0.005 | 8.1 | *24.9 | 3.5 | — | — | 0.007 | 0.15 | 0.006 |

An asterisk "*" represents deviation from the condition specified by the present invention.

TABLE 3

| Test reference | Base metal | Welding material | Shield gas | Back shield gas | Welding heat input (kJ/cm) | Weaving |
|---|---|---|---|---|---|---|
| J1 | A | X | Ar | $N_2$ | 5.3 | Not performed |
| J2 | | | | Ar + 50%$N_2$ | | |
| J3 | | | | Ar + 20%$N_2$ | | |
| J4 | | | Ar + 5%$N_2$ | Ar | | |
| J5 | B | | Ar | $N_2$ | | |
| J6 | | | | Ar + 50%$N_2$ | | |
| J7 | | | | Ar + 20%$N_2$ | | |
| J8 | | | Ar + 10%$N_2$ | Ar | | |
| J9 | A | Y | Ar | $N_2$ | | |
| J10 | | | | Ar + 50%$N_2$ | | |
| J11 | | | | Ar + 20%$N_2$ | | |
| J12 | | | Ar + 2%$N_2$ | Ar | | |
| J13 | B | | Ar | $N_2$ | | |
| J14 | | | | Ar + 50%$N_2$ | | |
| J15 | | | | Ar + 20%$N_2$ | | |
| J16 | | | Ar + 20%$N_2$ | Ar | | |
| J17 | | *V | Ar | $N_2$ | | |
| J18 | | W | | | | |
| J19 | | X | | | 7.2 | |
| J20 | | | | | 5.3 | Performed |
| J21 | | *Z | | | | Not performed |
| J22 | A | W | | | | |
| J23 | C | | | | | |
| J24 | | X | | | | |
| J25 | | Y | | | | |
| J26 | | *V | | | | |
| J27 | | *Z | | | | |

An asterisk "*" represents deviation from the condition specified by the present invention.

The crater surface area of each layer at the time of completing the welding was measured. The crater at the time of completing the welding corresponds to the surface of the molten pool during the welding, and thus this crater can be considered as the surface area of the molten pool during the welding.

A cross sectional microscopic test specimen was collected from each welded joint where the layer welding had been completed, and observation was conducted with an optical microscope on each specimen for the sake of investigating existence of weld defects.

As a result of the observation with the optical microscope, the specimens having no weld defects such as blowholes were determined as "acceptable". For each welded joint that has been determined to be "acceptable", chemical analysis of the weld metal was conducted, the amount of the ferrite in area ratio in a central portion of the weld metal was measured, and a plate-like tensile test specimen having the weld metal in its central parallel portion was collected from each welded joint so as to conduct a tensile test at a normal temperature.

In this tensile test, the specimens ruptured in their base metals were determined to be "acceptable", and from each welded joint determined to be "acceptable", a plate-like low strain rate tensile test specimen having the weld metal in its parallel portion was collected, and each test specimen was subjected to a low strain rate tensile test in the atmosphere, and in the high-pressure hydrogen environment of 85 MPa. The strain rate was $3\times10^{-5}$/s, and such a welded joint was determined to be "acceptable" in the low strain rate tensile test that had a ratio of 90% or more between the reduction of area after the rupture in the high-pressure hydrogen environment and the reduction of area after the rupture in the atmosphere.

Table 4 shows the examination result regarding the crater surface area corresponding to the surface area of the molten pool during the welding, and weld defects therein. Table 5 shows the chemical analysis result of the weld metal, and the measurement result of the amount (area ratio) of the ferrite in the weld metal. In addition, Table 6 shows the respective results of the tensile test and the low strain rate tensile test.

In Table 4, the symbol "-" in the columns of "Crater Surface Area of First Layer" and "Crater Surface Area of Second Layer" indicates that no measurement was conducted because of occurrence of countless blowholes.

In Table 5, the symbol "- -" for the test reference numerals J17 and J26 indicates that no chemical analysis of the weld metal and no measurement of the amount of the ferrite in the weld metal were conducted because of confirmation of the weld defects.

In the column "Tensile test" of Table 6, the symbol "◯" indicates that the specimen of interest was determined to be "acceptable" because rupture occurred in the base metal, and the symbol "x" indicates that rupture occurred in the weld metal. The symbol "-" indicates that no tensile test was conducted because of confirmation of the weld defect.

Similarly, in Table 6, in the column "Low Strain Rate Tensile Test", the symbol "◯" indicates that the specimen of interest was determined to be "acceptable" because the ratio of the reduction of area after the rupture in the high-pressure hydrogen environment relative to the reduction of area after the rupture in the atmosphere was 90% or more, and the symbol "x" indicates that the above ratio was less than 90%. The symbol "-" indicates that no low strain rate tensile test was conducted because of confirmation of the weld defect (test reference numerals J17 and J26), or because of occurrence of the rupture in the weld metal in the tensile test (test reference numerals J19 and J20).

TABLE 4

| Test reference | Crater surface area of first layer (mm$^2$) | Crater surface area of second layer (mm$^2$) | Weld defect |
|---|---|---|---|
| J1 | 82 | 82 | No defect |
| J2 | 84 | 88 | No defect |
| J3 | 81 | 82 | No defect |
| J4 | 82 | 86 | No defect |
| J5 | 91 | 95 | No defect |
| J6 | 89 | 91 | No defect |
| J7 | 92 | 95 | No defect |
| J8 | 90 | 91 | No defect |
| J9 | 77 | 88 | No defect |
| J10 | 78 | 82 | No defect |
| J11 | 80 | 84 | No defect |
| J12 | 76 | 79 | No defect |
| J13 | 80 | 82 | No defect |
| J14 | 82 | 83 | No defect |
| J15 | 82 | 84 | No defect |
| J16 | 84 | 86 | No defect |
| J17 | — | — | Countless blowholes |
| J18 | 83 | 88 | No defect |
| J19 | 126 | 132 | No defect |
| J20 | 134 | 145 | No defect |
| J21 | 75 | 79 | No defect |
| J22 | 84 | 92 | No defect |
| J23 | 81 | 84 | No defect |
| J24 | 82 | 87 | No defect |
| J25 | 83 | 90 | No defect |
| J26 | — | — | Countless blowholes |
| J27 | 87 | 94 | No defect |

The symbol "—" in the columns of "Crater surface area of first layer" and "Crater surface area of second layer" indicates that no measurement was conducted because of occurrence of countless blowholes.

TABLE 5

| Test reference | Chemical composition (mass %) Balance: Fe and impurities | | | | | | | | | | | | | Value on left term of Formula (1) | Area ratio of ferrite (%) |
| | C | Si | Mn | P | S | Ni | Cr | Mo | V | Nb | Al | N | O | | |
|---|---|---|---|---|---|---|---|---|---|---|---|---|---|---|---|
| J1 | 0.059 | 0.28 | 3.13 | 0.031 | 0.003 | 10.7 | 21.6 | 0.8 | 0.09 | 0.12 | 0.010 | 0.20 | 0.006 | −147 | 9.2 |
| J2 | 0.058 | 0.29 | 3.17 | 0.030 | 0.002 | 10.8 | 21.5 | 0.9 | 0.09 | 0.13 | 0.011 | 0.19 | 0.004 | −144 | 8.0 |
| J3 | 0.060 | 0.28 | 3.08 | 0.030 | 0.003 | 10.6 | 21.5 | 0.8 | 0.08 | 0.12 | 0.010 | 0.18 | 0.005 | −135 | 8.6 |
| J4 | 0.059 | 0.29 | 3.15 | 0.031 | 0.003 | 10.7 | 21.4 | 0.9 | 0.09 | 0.12 | 0.010 | 0.18 | 0.005 | −137 | 8.2 |
| J5 | 0.060 | 0.28 | 2.71 | 0.029 | 0.004 | 9.7 | 21.1 | 0.9 | — | 0.15 | 0.008 | 0.19 | 0.005 | −125 | 6.5 |
| J6 | 0.063 | 0.27 | 2.64 | 0.033 | 0.002 | 9.6 | 20.9 | 0.8 | — | 0.13 | 0.007 | 0.18 | 0.003 | −115 | 7.2 |
| J7 | 0.061 | 0.28 | 2.68 | 0.032 | 0.004 | 9.5 | 21.2 | 0.9 | — | 0.14 | 0.008 | 0.17 | 0.003 | −115 | 6.8 |
| J8 | 0.059 | 0.29 | 2.75 | 0.031 | 0.003 | 9.7 | 21.0 | 1.0 | — | 0.15 | 0.006 | 0.17 | 0.005 | −116 | 7.5 |
| J9 | 0.021 | 0.41 | 3.03 | 0.015 | 0.005 | 13.0 | 20.5 | 3.1 | 0.10 | 0.10 | 0.009 | 0.23 | 0.006 | −193 | 7.4 |
| J10 | 0.019 | 0.40 | 2.92 | 0.016 | 0.004 | 13.2 | 20.4 | 3.0 | 0.09 | 0.09 | 0.008 | 0.22 | 0.005 | −185 | 7.2 |
| J11 | 0.020 | 0.39 | 2.95 | 0.016 | 0.005 | 13.2 | 20.3 | 3.1 | 0.09 | 0.08 | 0.008 | 0.22 | 0.002 | −186 | 7.6 |
| J12 | 0.022 | 0.41 | 2.97 | 0.014 | 0.002 | 13.1 | 20.6 | 3.2 | 0.10 | 0.09 | 0.008 | 0.21 | 0.004 | −188 | 7.8 |
| J13 | 0.020 | 0.40 | 2.55 | 0.016 | 0.005 | 12.2 | 19.8 | 3.3 | 0.01 | 0.12 | 0.007 | 0.23 | 0.004 | −175 | 11.2 |
| J14 | 0.019 | 0.43 | 2.53 | 0.017 | 0.004 | 12.3 | 19.7 | 3.1 | 0.01 | 0.13 | 0.009 | 0.22 | 0.003 | −166 | 11.5 |
| J15 | 0.020 | 0.40 | 2.63 | 0.016 | 0.005 | 12.0 | 19.7 | 3.2 | 0.01 | 0.14 | 0.008 | 0.21 | 0.003 | −161 | 12.0 |
| J16 | 0.019 | 0.41 | 2.50 | 0.015 | 0.004 | 12.4 | 19.8 | 3.3 | 0.01 | 0.11 | 0.007 | 0.20 | 0.004 | −162 | 10.8 |
| J17 | — | — | — | — | — | — | — | — | — | — | — | — | — | — | — |
| J18 | 0.019 | 0.23 | 2.33 | 0.019 | 0.004 | 8.9 | 19.6 | 1.0 | — | 0.12 | 0.007 | 0.18 | 0.006 | *−69 | 17.2 |
| J19 | 0.055 | 0.31 | 2.86 | 0.029 | 0.003 | 9.7 | 21.0 | 1.2 | — | 0.17 | 0.008 | *0.14 | 0.005 | −107 | 9.8 |
| J20 | 0.051 | 0.30 | 2.84 | 0.025 | 0.002 | 9.5 | 21.2 | 1.1 | — | 0.18 | 0.009 | *0.13 | 0.005 | −100 | 9.8 |
| J21 | 0.023 | 0.38 | 2.35 | 0.020 | 0.003 | 8.7 | 23.2 | 3.1 | — | 0.12 | 0.008 | 0.20 | 0.006 | −171 | *38.6 |
| J22 | 0.019 | 0.22 | 2.65 | 0.019 | 0.004 | 9.8 | 20.1 | 0.8 | 0.08 | 0.09 | 0.008 | 0.19 | 0.007 | −90 | 13.1 |

TABLE 5-continued

| Test reference | Chemical composition (mass %) Balance: Fe and impurities | | | | | | | | | | | | | Value on left term of Formula (1) | Area ratio of ferrite (%) |
|---|---|---|---|---|---|---|---|---|---|---|---|---|---|---|---|
| | C | Si | Mn | P | S | Ni | Cr | Mo | V | Nb | Al | N | O | | |
| J23 | 0.034 | 0.22 | 2.95 | 0.018 | 0.004 | 8.5 | 21.0 | — | — | — | 0.007 | 0.20 | 0.006 | −89 | 11.3 |
| J24 | 0.074 | 0.27 | 3.31 | 0.031 | 0.003 | 9.4 | 22.4 | — | — | 0.03 | 0.009 | 0.21 | 0.005 | −144 | 9.8 |
| J25 | 0.033 | 0.40 | 3.06 | 0.015 | 0.005 | 12.0 | 21.1 | 2.4 | 0.01 | — | 0.007 | 0.23 | 0.004 | −184 | 7.8 |
| J26 | — | — | — | — | — | — | — | — | — | — | — | — | — | — | — |
| J27 | 0.038 | 0.37 | 2.98 | 0.019 | 0.003 | 8.4 | *24.6 | 2.0 | — | — | 0.008 | 0.20 | 0.005 | −178 | *41.1 |

Left term of Formula (1): 413-462(C + N)—9.2Si—8.1Mn—13.7Cr—9.5Ni—18.5Mo
A symbol "— —" for the test reference numerals J17 and J26 indicates that no chemical analysis of the weld metal and no measurement of the amount of the ferrite in the weld metal were conducted because of confirmation of the weld defects.
An asterisk "*" represents deviation from the condition specified by the present invention.

TABLE 6

| | Test reference | Tensile test | Low strain rate tensile test |
|---|---|---|---|
| Inventive example | J1 | ○ | ○ |
| | J2 | ○ | ○ |
| | J3 | ○ | ○ |
| | J4 | ○ | ○ |
| | J5 | ○ | ○ |
| | J6 | ○ | ○ |
| | J7 | ○ | ○ |
| | J8 | ○ | ○ |
| | J9 | ○ | ○ |
| | J10 | ○ | ○ |
| | J11 | ○ | ○ |
| | J12 | ○ | ○ |
| | J13 | ○ | ○ |
| | J14 | ○ | ○ |
| | J15 | ○ | ○ |
| | J16 | ○ | ○ |
| Comparative example | *J17 | — | — |
| | *J18 | ○ | x |
| | *J19 | x | — |
| | *J20 | x | — |
| | *J21 | ○ | x |
| Inventive example | J22 | ○ | ○ |
| | J23 | ○ | ○ |
| | J24 | ○ | ○ |
| | J25 | ○ | ○ |
| Comparative example | *J26 | — | — |
| | *J27 | ○ | x |

The symbol "○" in the column "Tensile test" indicates that the rupture occurred in the base metal, and the symbol "x" indicates that the rupture occurred in the weld metal. The symbol "—" indicates that no tensile test was conducted.
The symbol "○" in the column "Low strain rate tensile test" indicates that the ratio between the reduction of area after the rupture in the high-pressure hydrogen environment and the reduction of area after the rupture in the atmosphere was 90% or more, the symbol "x" indicates that the above ratio was less than 90%. The symbol "—" indicates that no low strain rate tensile test was conducted.
An asterisk "*" indicates a welded joint deviating from the condition specified by the present invention.

In Tables 4 to 6, in the case of the test reference numerals J1 to J16 and J22 to J25 of Inventive examples that satisfied all the conditions specified by the present invention, it is obvious that each welded joint had no weld defect occurred therein, and had high strength and excellent hydrogen embrittlement resistance at the same time.

To the contrary, in the case of the test reference numerals J17 to J21, J26, and J27 of Comparative examples, there was such a problem in each welded joint that at least the occurrence of the weld defect was confirmed, the rupture occurred in the weld metal, or the hydrogen embrittlement resistance was poor.

Specifically, in the test reference numerals J17 and J26, the welding material indicated by the reference character V whose amount of N was 0.37%, which was more than the upper limit of the range specified by the present invention, was used so that N could not be dissolved in the weld metal during the welding, which generated countless blowholes (see Table 4).

In the test reference numeral J18, the value on the left term of Formula (1) was −69 in the weld metal, which did not satisfy the condition of Formula (1), so that martensite was generated through the deformation processing at the time of the low strain rate tensile test, resulting in deterioration of the hydrogen embrittlement resistance of the weld metal (see Table 5 and Table 6).

In both the test reference numerals J19 and J20, each crater surface area was more than 120 mm$^2$, and the scatters of N from the surface of the molten pool became increased, and the amount of N in the weld metal was less than the range specified by the present invention. Consequently, the rupture occurred in the weld metal (see Tables 4 to 6).

In the test reference numerals J21 and J27, the welding material indicated by the reference character Z having the Cr content of 24.9% that was more than the upper limit of the range specified by the present invention was used. Consequently, in the test reference numeral J21, although the chemical composition of the weld metal satisfied the range specified by the present invention, a large amount of Cr relative to the amount of Ni was contained, so that the amount of the ferrite became more than 20%, and the hydrogen embrittlement susceptibility of the weld metal became increased. In addition, in the test reference numeral J27, the amount of Cr in the weld metal was more than the upper limit of the range specified by the present invention, and a large amount of Cr was contained in the weld metal, so that the amount of the ferrite became more than 20%, and the hydrogen embrittlement susceptibility of the weld metal became increased (see Table 5 and Table 6).

INDUSTRIAL APPLICABILITY

According to the present invention, it is possible to provide a welded joint having both high strength and excellent hydrogen embrittlement resistance which are properties required in high-pressure gas piping, particularly in high-pressure hydrogen gas piping without the postweld heat treatment.

What is claimed is:
1. An austenitic steel welded joint produced by welding base metal of austenitic steel with a gas tungsten arc welding process which uses welding material of austenitic steel, wherein
the base metal has a chemical composition comprising: by mass %, an amount of C, the C amount 0.1% or less; Si: 0.8% or less; Mn: 2.5 to 5.5%; Ni: 8 to 15%; Cr: 19 to 25%; Al: less than 0.05%; N: 0.15 to 0.45%; and optionally one or more of, by mass %, V: 0.5% or less, Nb:

0.5% or less, and Mo: 4.5% or less, the balance being Fe and impurities that contain O: 0.02% or less, P: 0.05% or less, and S: 0.03% or less, and the welding material has a chemical composition comprising: by mass %, an amount of C, the C amount 0.1% or less; Si: 0.8% or less; Mn: 1.5 to 4.5%; Ni: 8 to 15%; Cr: 18 to 24%; Al: less than 0.05%; N: 0.15 to 0.35%; and optionally one or more of, by mass %, V: 0.5% or less, Nb: 0.5% or less, and Mo: 4.5% or less, the balance being Fe and impurities that contain O: 0.02% or less, P: 0.05% or less, and S: 0.03% or less, wherein weld metal has a chemical composition comprising: by mass %, an amount of C, the C amount 0.1% or less; Si: 0.8% or less; Mn: 1.5 to 5.5%; Ni: 8 to 15%; Cr: 18 to 24%; Al: less than 0.05%; N: 0.15 to 0.35%, V: 0.5% or less, Nb: 0.5% or less, and Mo: 4.5% or less, the balance being Fe and impurities that contain O: 0.02% or less, P: 0.05% or less, and S: 0.03% or less, the chemical composition of the weld metal satisfies Formula (1), and an amount of ferrite in the weld metal is 20% or less in area ratio, such that Formula (1) is:

$$413-462(C+N)-9.2Si-8.1Mn-13.7Cr-9.5Ni-18.5Mo \leq -70 \tag{1}$$

where a symbol of each element in Formula (1) denotes a content (mass %) of the element.

2. The austenitic steel welded joint according to claim 1, wherein the chemical composition of any one or more of the base metal, the welding material, and the weld metal comprise one or more of, by mass %, V: 0.01 to 0.5%, Nb: 0.01 to 0.5%, and Mo: 0.1 to 4.5%.

* * * * *